J. KIEFER.
NUT LOCK.
APPLICATION FILED APR. 11, 1916.
1,208,980.
Patented Dec. 19, 1916.
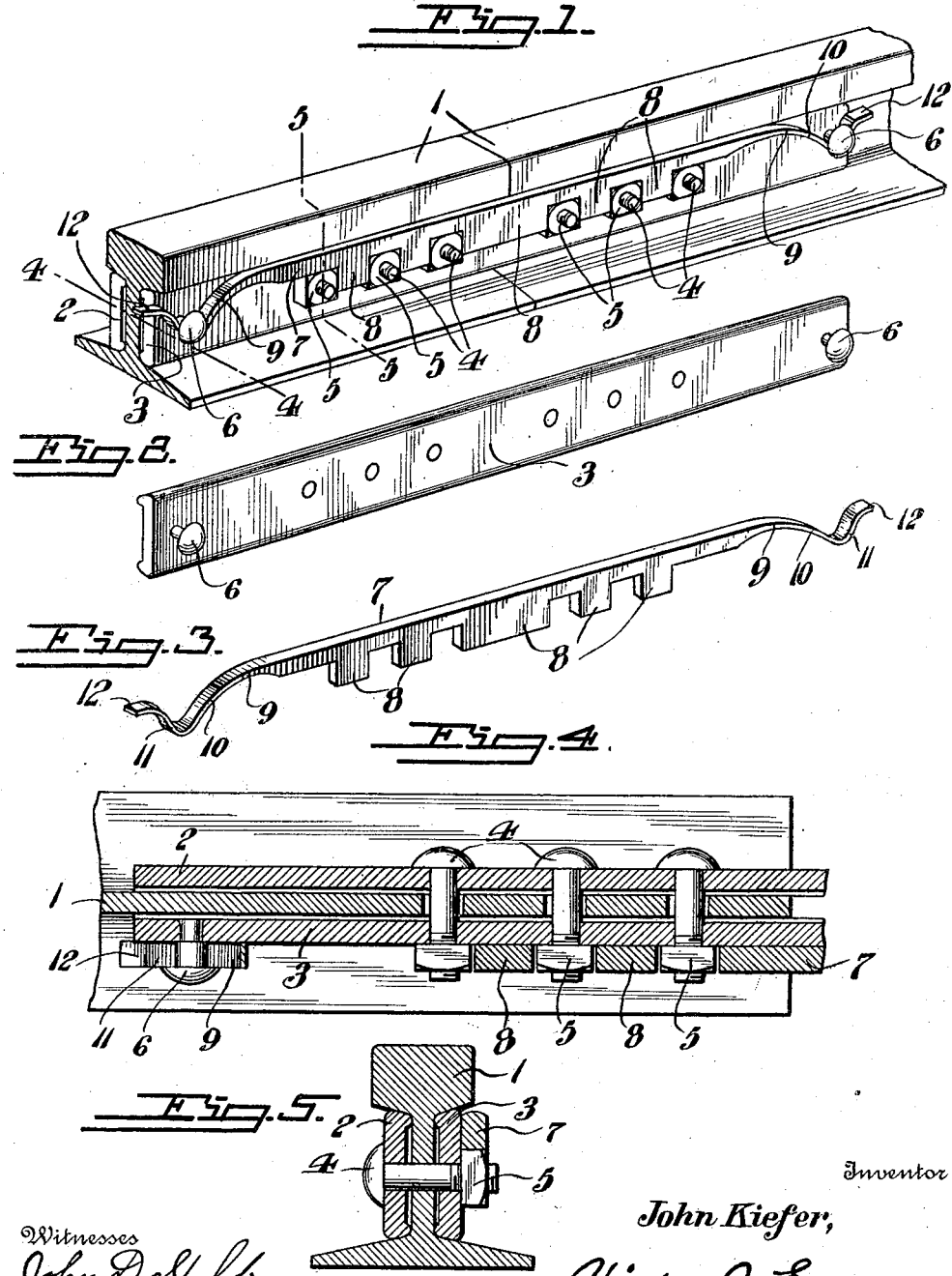
Witnesses
John D. Spalding
Inventor
John Kiefer,
By Victor J. Evans
Attorney

UNITED STATES PATENT OFFICE.

JOHN KIEFER, OF FLINTON, PENNSYLVANIA.

NUT-LOCK.

1,208,980.  Specification of Letters Patent.  Patented Dec. 19, 1916.

Application filed April 11, 1916. Serial No. 90,461.

*To all whom it may concern:*

Be it known that I, JOHN KIEFER, a citizen of the United States, residing at Flinton, in the county of Cambria and State of Pennsylvania, have invented new and useful Improvements in Nut-Locks, of which the following is a specification.

The present invention relates to nut locks.

An object of the invention is to provide a plate through which the bolts pass upon which the nuts are screwed with a bar that is notched to receive the nuts, the said bar having its opposite ends formed with spring members which co-act with headed members upon the plate so as to sustain the bar locked upon the plate to prevent the rotation of the nuts.

A further object of the invention is to provide a device of this character which shall include the desirable features of simplicity, cheapness and durability.

With the above and other objects in view, the improvement resides in the construction, combination and arrangement of parts set forth in the following specification and falling within the scope of the appended claims.

In the drawing: Figure 1 is a perspective view illustrating the application of my improvement, Fig. 2 is a similar view of the plate through which the bolts pass, Fig. 3 is a similar view of the locking bar, Fig. 4 is a detail horizontal sectional view approximately on the line 4—4 of Fig. 1, and Fig. 5 is a transverse sectional view approximately on the line 5—5 of Fig. 1.

In the drawing I have illustrated my improvement in connection with means for joining two railway rails, but it is to be understood that the improvement is not to be thus restricted in its useful capacity, as the same may be employed with equal efficiency upon other structures and devices.

The numerals 1 designate the rails which have arranged upon their opposite faces plates 2 and 3 respectively, while bolts 4 pass through the said plates and through openings in the webs of the rails, the said bolts being provided with securing nuts 5. The plate 3, against which the nuts 5 contact has its opposite ends formed with outwardly projecting headed studs 6.

The numeral 7 designates a bar, the same having its lower edge notched, as at 8, and each of said notches is adapted to receive one of the nuts 5 so that the edges of the nuts will contact with the walls provided by the notches. The bar 7 is formed of some suitable metal, and has its upper portion, from its outer notches, reduced to provide spring extensions 9. These springs are curved or arched downwardly with respect to the device as illustrated in the drawing, as indicated by the numerals 10, and are from thence rounded upwardly, as at 11, and extended angularly to provide what I will term fingers 12.

In arranging the device upon the plate 3 to bring its notches to engage with the nuts, one of the springs may be brought to engage with one of the studs 6 of the plate 3 and its opposite spring member 9 compressed by the contact with the finger 12 permitting the bar to have its notches receive the nuts, it being understood that the bar is sustained at an angle with relation to the plate 3, and when the spring end of the bar being operated upon is forced below the head of the second stud upon the plate 3, an inward pressure upon the said bar will properly position the nuts within the notches and by relieving the pressure or tension upon the finger 12, the spring end, upon which the said finger is provided, will automatically spring into engagement with the second stud 6 of the plate 3. The spring members 9 of the bar are approximately of a width equaling the length of the shanks for the studs 6, so that the same will contact with the plate as well as with the heads of the shanks and thus obviate side movement or vibration.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. In combination, a plate through which bolts pass, and nuts upon the bolts, said plate having headed studs at its opposite ends, a bar having notches to receive the nuts, said bar from its end notches being reduced to provide spring extensions, and the said extensions adapted to be forced into engagement with the shanks of the headed studs.

2. In combination, a plate having openings through which the ends of bolts pass, nuts threaded upon the bolts and contacting with the said plate, said plate adjacent its ends having headed studs, a bar having one of its edges notched to receive the nuts, said bar being of a thickness approximately equaling the length of the shanks of the studs, and being reduced from its end notches to provide curved spring members, said springs including rounded portions which are adapted to snugly contact with the shanks of the studs and to engage between the heads of the studs and the plate, and the ends of the said spring members terminating in angularly disposed portions providing fingers.

In testimony whereof I affix my signature in presence of two witnesses.

JOHN KIEFER.

Witnesses:
OLIVER T. REFFNER,
JESSE BRACKEN.

Copies of this patent may be obtained for five cents each, by addressing the "Commissioner of Patents, Washington, D. C."